United States Patent [19]

Oda et al.

[11] Patent Number: 4,721,653

[45] Date of Patent: Jan. 26, 1988

[54] VACUUM BRAZING SHEET FOR USE IN ALUMINUM HEAT EXCHANGER

[75] Inventors: Hidetaka Oda; Akio Fukada, both of Konan; Kikuo Toyose, Tochigi; Jun Takigawa, Tochigi; Masao Takemoto, Tochigi, all of Japan

[73] Assignee: Kabushiki Kaisha Kobe Seiko Sho, Kobe, Japan

[21] Appl. No.: 911,452

[22] Filed: Sep. 25, 1986

[30] Foreign Application Priority Data

Sep. 25, 1985 [JP] Japan .................................. 60-211276

[51] Int. Cl.$^4$ ............................ D06N 7/04; B62B 9/00
[52] U.S. Cl. ................................. 428/472.2; 428/149; 428/650; 428/654
[58] Field of Search ............ 428/650, 654, 149, 472.2

[56] References Cited

U.S. PATENT DOCUMENTS

| | | | |
|---|---|---|---|
| 3,881,879 | 5/1975 | Singleton, Jr. et al. | 29/193 |
| 3,898,053 | 8/1975 | Singleton, Jr. | 29/197.5 |
| 3,963,453 | 6/1976 | Singleton, Jr. | 29/197.5 |
| 3,963,454 | 6/1976 | Singleton, Jr. | 29/197.5 |
| 4,146,163 | 3/1979 | Anderson et al. | 228/158 |
| 4,464,442 | 8/1984 | McDonald et al. | 428/654 |

*Primary Examiner*—John E. Kittle
*Assistant Examiner*—Patrick J. Ryan
*Attorney, Agent, or Firm*—Oblon, Fisher, Spivak, McClelland, & Maier

[57] ABSTRACT

A vacuum brazing sheet for use in drawn-cup type heat exchanger made of aluminum with the degree of closure from 0.2 to 4.0 cm$^2$/l, wherein a brazing material containing:

Si 11–14 wt. %

Mg 1.0–2.0 wt. % and the balance of Al is clad on one or both surfaces of aluminum or aluminum alloy material.

The brazing performance can be improved and stabilized, and higher yield can be obtained.

1 Claim, 7 Drawing Figures

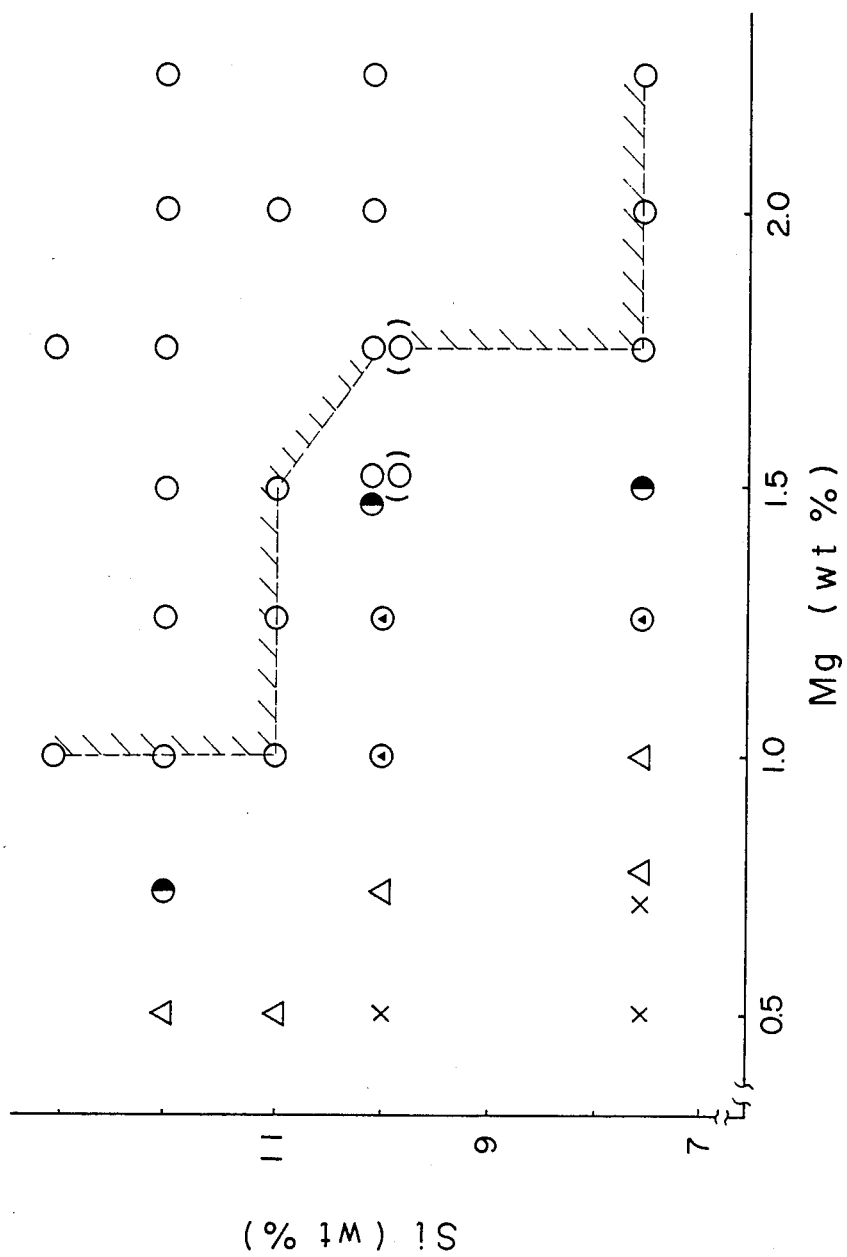

VACUUM BRAZING SHEET FOR USE IN ALUMINUM HEAT EXCHANGER

BACKGROUND OF THE INVENTION

1. Field of the Invention

This invention concerns a vacuum brazing sheet for use in drawn-cup type heat exchangers made of aluminum and, more specifically, it relates to a vacuum brazing sheet capable of obtaining excellent brazing property upon assembling a drawn-cup type heat exchanger made of aluminum having the degree of closure from 0.2 to 4.0 cm$^2$/l manufactured by a vacuum brazing method.

2. Description of the Prior Art

A drawn-cup heat exchanger has a structure as shown in FIG. 5(b) in which tubular members 11 fabricated from a brazing sheet into a cup-shape are stacked and fins 12 are arranged between the tubular members 11 and the inside thereof is semi-sealed. Accordingly, the brazing joined portion comprises, as shown in FIG. 5(a), a joint portion situated at the outer surface 13 and a joined portion situated at an inner surface 14, both of which should be joined sufficiently by brazing.

Further, a vacuum brazing method without requiring the use of fluxes has been developed as the brazing process and employed generally since the method is free from the problems of environmental pollutions. The vacuum brazing method is mainly used also in the brazing of the drawn-cup heat exchanger.

The brazing sheet for use in the vacuum brazing of the drawn-cup heat exchanger employed generally so far is made JIS-BA8PC material comprising:
brazing material: Al-10Si-1.5 Mg
core material: 3003

While the brazing performance of the material at the outer surface of the drawn-cup heat exchanger is generally satisfactory, the brazing performance at the inner surface is not sufficient in view of the fillet-forming thus some time failing to obtain a predetermined joining strength, which causes a reduction in the yield.

As the countermeasure, there has been proposed to:
(1) reduce the Mg content in the brazing composition at the brazing surface of the inner side (refer to Japanese patent publication No. 54909/1983), or
(2) incorporate Bi, Sn, Sb, Ba, Be, etc. to the brazing composition at the brazing surface of the inner side (refer to Japanese patent laid-open No. 85375/1984).

However, since the inner and the outer surfaces lie on the identical surface of brazing material in the drawn-cup heat exchanger, they can not be actually applied and, accordingly, there have not yet been found satisfactory improving methods.

OBJECT OF THE INVENTION

This invention has been made for overcoming the problems in the brazing material composition of the brazing sheet upon assembling the drawn-cup heat exchanger and it is an object of the invention to provide a brazing sheet capable of forming satisfactory fillets for both of the joined portions at the outer and the inner surfaces and capable of stably obtaining the joining strength greater than a predetermined level upon assembling the drawn-cup heat exchanger with the degree of closure (opening area/vessel volume) being from 0.2 to 4.0 cm$^2$/l.

SUMMARY OF THE INVENTION

The foregoing object can be attained in accordance with this invention by a vacuum brazing sheet for use in drawn-cup type heat exchanger made of aluminum, wherein a brazing material containing:
Si 11–14 wt %,
Mg 1.0–2.0 wt %, and
the balance of aluminum is clad on one or both surfaces of an aluminum or aluminum alloy member.

Explanation will now be made more specifically to a vacuum brazing sheet for use in drawn-cup heat exchanger made of aluminum according to this invention (hereinafter some times simply referred to as a brazing sheet according to this invention).

The ingredients and the ratio thereof contained in the brazing material for use in the brazing sheet according to this invention will now be explained at first.

Ingredient Si:

In the vacuum brazing method, since Mg contained in the brazing material evaporates during vacuum heating to capture $O_2$ in the atmosphere by reacting with $H_2O$ or $O_2$ contained therein, and serves to prevent from the reoxidation of the surface after $Al_2O_3$ formed on the surface of the brazing material is destructed due to the heat expansion of Al base material, (generally referred as the getter effect), the wettability of the brazing material is improved. Since the drawn-cup type heat exchanger is formed as a semi-closed structure, the vacuum degree at the inner surface side is inferior to that at the outer surface side, the evaporation vapor amount of Mg is decreased and the evaporated Mg is not sufficiently discharged externally but it is deposited. Accordingly, since the Mg getter effect is lower at the inner surface as compared with that at the outer surface, the wettability at the inner surface is also poorer than that at the outer surface.

The Si content is made greater than that in the conventional brazing material as explained above in order to improve the wettability of the brazing material on the inner surface as explained previously. No substantial improvement can be attained for the wettability of the brazing material if the Si content is less than 11 wt % and, while on the other hand, the improving effect is saturated and the workability is rather degraded if Si is contained in excess of 14 wt %. Accordingly, the Si content is defined as from 11 to 14 wt %.

The brazing sheet according to this invention is used on the premise that the brazing temperature is lower than 600° C., which is a general brazing temperature for the vacuum brazing. Although the improving effect for the brazing on the inner surface side can be attained also in the conventional brazing material containing 10 wt % Si by increasing the brazing temperature to about 620° C., since the deformation buckling is abruptly increased in the brazing sheet material and the fin material due to the increase in the brazing temperature and, further, since erosion of the brazing material to the core material and fin material is remarkably increased, there is a problem in the use of the brazing material of 10 wt % Si content.

The effect obtained by increasing the brazing temperature is functionally the same as that obtained by the increase in the Si content of the brazing material in the brazing sheet according to this invention. In the brazing sheet according to this invention, the effect obtained by increasing the brazing temperature can be attained by lowering the melting temperature of the brazing material, that is, the liquidus line temperature.

Ingredient Mg:

Mg is an essential element for providing the getter effect in the vacuum brazing and the brazing joint becomes more favorable as the Mg content is higher on the outer surface and as the Mg content is lower on the inner surface. The Mg content is defined to the lower limit of 1.0 wt % capable of satisfying the brazing performance at the outer surface (naturally satisfying the brazing performance at the inner surface). Further, if Mg is contained in excess of 2.0 wt %, the effect is saturated, the workability is degraded and the erosion of the brazing material to the core member upon brazing is increased. Accordingly, the Mg content is defined from 1.0 to 2.0 wt %.

Further, the brazing material for the brazing sheet according to this invention may be allowed to contain up to 0.3 wt % of Bi, Be and Li in addition to Si and Mg as the essential ingredients.

In the brazing sheet according to this invention, generally employed 3003 material can be used as the core and any of aluminum alloys which would not cause burning upon brazing can be used as the core.

BRIEF DESCRIPTION OF THE ACCOMPANYING DRAWINGS

These and other objects, features as well as advantageous effects of this invention will become apparent by the following descriptions for preferred embodiments according to this invention while referring to the accompanying drawings, wherein FIGS. 1(a)-(b) is a view illustrating a test piece manufactured by a vacuum brazing sheet for use in a drawn-cup heat exchanger made of aluminum according to this invention;

FIGS. 3 and 4 are diagrams illustrating the relationship between the Si content and the Mg content.

DESCRIPTION OF THE PREFERRED EMBODIMENT

Examples of vacuum brazing sheets for use in drawn-cup type heat exchangers made of aluminum according to this invention will now be explained more specifically.

EXAMPLE 1

Figure 1A:
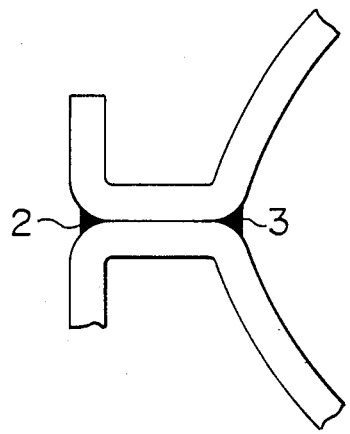
Figure 1B:
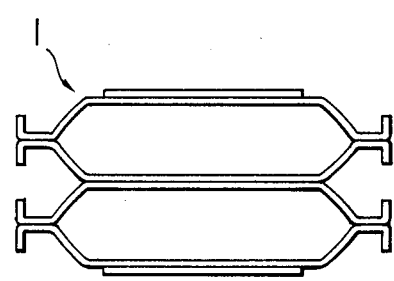
Figure 2:
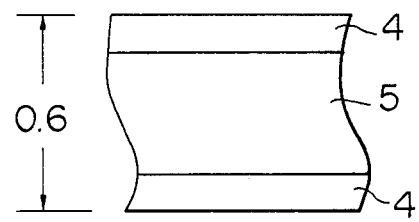
FIG. 2 is a schematic view for the example.
Figure 5A:
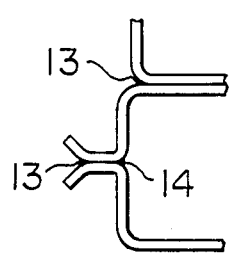
FIGS. 5(a)-(b) is a schematic view for a typical drawn-cup heat exchanger.
Figure 5B:
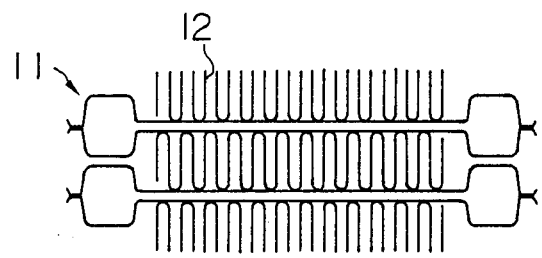

By using the brazing material as shown in Table 1 and core material as shown in Table 2, a brazing sheet 0.6t-0 material comprising brazing material 4/core material (A3003) 5/brazing material 4 having 30% clads on both sides as shown in FIG. 2 was manufactured. The material fabricated into a test piece simulated to a drawn-cup heat exchanger shown in FIG. 1(b) and applied with vacuum degree brazing by heating at 595° C. × 2 minutes under the vacuum of $8 \times 10^{-5}$ Torr. FIG. 1(a) shows the brazing state. The results of the evaluation both of the outer face fillet 2 and the inner face fillet 3 are shown in FIGS. 3 and 4.

Figure 4:
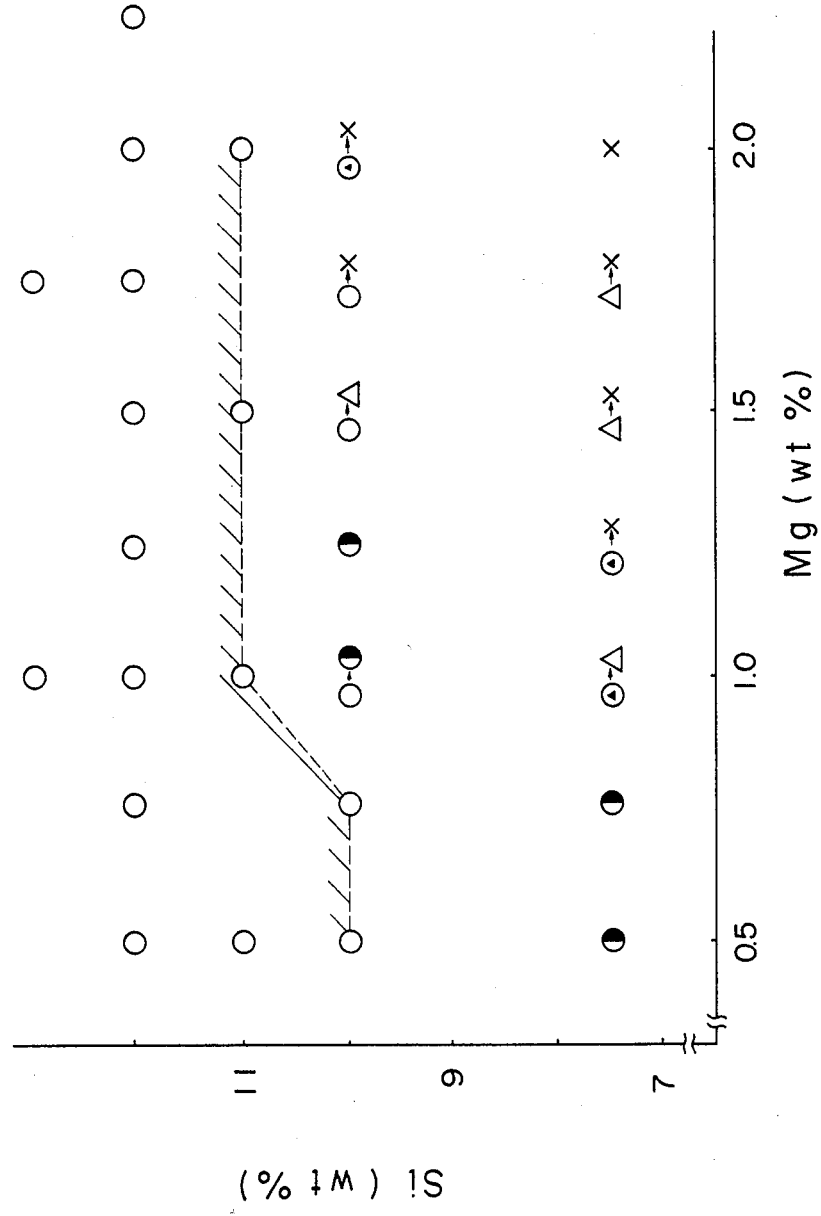

○ . . . fillets were formed largely and uniformly
◐ . . . fillets were formed moderately and uniformly
◉ . . . fillets were formed moderately and partially not uniformly
△ . . . fillets were formed insufficiently and not uniformly
x . . . fillets were formed only partially or not substantially From FIGS. 3 and 4, it can be seen that fillets are formed sufficiently on both of the outer and the inner surfaces and stable brazing performance can be attained with the brazing material containing more than 11 wt % Si and 1.0 wt % Mg of the brazing sheet according to this invention.

TABLE 1

| No. | Brazing material (wt %) | | |
|---|---|---|---|
|  | Si | Mg | Bi |
| 1 | 12.1 | 0.49 | — |
| 2 | 11.9 | 0.73 | — |
| 3 | 12.0 | 1.01 | — |
| 4 | 12.1 | 1.22 | — |
| 5 | 12.0 | 1.49 | — |
| 6 | " | 1.77 | — |
| 7 | 11.9 | 2.03 | — |
| 8 | 12.2 | 2.29 | — |
| 9 | 12.9 | 1.03 | — |
| 10 | 13.1 | 1.78 | — |
| 11 | 11.2 | 0.50 | — |
| 12 | 11.1 | 1.03 | — |
| 13 | 11.2 | 1.48 | — |
| 14 | 11.0 | 2.01 | — |
| 15 | " | 0.53 | — |
| 16 | 10.1 | 0.72 | — |
| 17 | 9.8 | 1.03 | — |
| 18 | " | 1.26 | — |
| 19 | " | 1.49 | — |
| 20 | 10.2 | 1.78 | — |
| 21 | 10.1 | 1.99 | — |
| 22 | " | 2.29 | — |
| 23 | 10.2 | 1.52 | 0.09 |
| 24 | 10.1 | 1.74 | 0.08 |
| 25 | 7.7 | 0.51 | — |
| 26 | 7.6 | 0.74 | — |
| 27 | 7.8 | 0.99 | — |
| 28 | " | 1.22 | — |
| 29 | 7.6 | 1.51 | — |
| 30 | 7.5 | 1.74 | — |
| 31 | 7.6 | 2.02 | — |
| 32 | " | 2.28 | — |

No. 3–No. 7, No. 9–No. 10, No. 12–No. 14 : Brazing sheet according to this invention
No. 1–No. 2, No. 8, No. 11, No. 15–No. 32 : Comparative material

TABLE 2

|  | Mn | Cu | Fe | Ti |
|---|---|---|---|---|
| A3003 | 1.20 | 0.14 | 0.56 | 0.03 |

As has been described above, since the vacuum brazing sheet for use in drawn-cup type heat exchanger made of aluminum according to this invention has the foregoing constitution, it is possible to improve and stabilize the brazing performance of the drawn-cup heat exchanger, as well as it is possible to obtain an effect capable of expecting the improvement in the yield.

What is claimed is:

1. A clad sheet of aluminum or aluminum alloy having on one or both of its surfaces a brazing alloy consisting essentially of about 11–13 wt. % silicon, 1.0–2.0 wt. % Mg, and the balance aluminum.

* * * * *